(12) United States Patent
Kuki et al.

(10) Patent No.: US 8,465,010 B2
(45) Date of Patent: Jun. 18, 2013

(54) VIBRATION DAMPING RUBBER BUSHING

(75) Inventors: Norimasa Kuki, Komaki (JP);
Yoshikane Akiyama, Komaki (JP);
Mitiharu Hikosaka, Komaki (JP);
Kazuhiko Kato, Komaki (JP); Hitoshi Kawai, Seto (JP); Mie Miyauchi, Toyota (JP)

(73) Assignees: Tokai Rubber Industries, Ltd., Komaki-Shi (JP); Toyota Jidosha Kabushiki Kaisha, Toyota (JP)

( * ) Notice: Subject to any disclaimer, the term of this patent is extended or adjusted under 35 U.S.C. 154(b) by 302 days.

(21) Appl. No.: 12/821,409

(22) Filed: Jun. 23, 2010

(65) Prior Publication Data
US 2010/0327499 A1    Dec. 30, 2010

(30) Foreign Application Priority Data
Jun. 29, 2009    (JP) .................. 2009-154032

(51) Int. Cl.
*F16F 1/44*    (2006.01)
(52) U.S. Cl.
USPC .................. 267/293; 267/141.2
(58) Field of Classification Search
USPC ............. 267/140.11, 140.12, 140.3, 140.4, 267/141, 141.2, 141.3, 141.4, 141.5, 292, 267/293
See application file for complete search history.

(56) References Cited

U.S. PATENT DOCUMENTS

| | | | | |
|---|---|---|---|---|
| 3,572,677 A | * | 3/1971 | Damon | 267/281 |
| 3,584,857 A | * | 6/1971 | Hipsher | 267/281 |
| 4,002,327 A | * | 1/1977 | Damon | 267/281 |
| 5,301,414 A | * | 4/1994 | Gautheron | 29/451 |
| 6,616,130 B2 | | 9/2003 | Hokazono et al. | |
| 6,899,323 B2 | * | 5/2005 | Takeshita et al. | 267/140.12 |

FOREIGN PATENT DOCUMENTS

| FR | 2715702 A1 | * | 8/1995 |
|---|---|---|---|
| JP | 61248930 A | * | 11/1986 |
| JP | A-11-22770 | | 1/1999 |
| JP | A-2005-337473 | | 12/2005 |
| WO | WO 2004065035 A1 | * | 8/2004 |

OTHER PUBLICATIONS

English-language abstract of JP 61248930 A.*
Machine translation of FR 2715702.*
Chinese Office Action dated Sep. 22, 2011 issued in Chinese Patent Application No. 201010212284.2 (with partial translation).

* cited by examiner

*Primary Examiner* — Bradley King
*Assistant Examiner* — Nicholas J Lane
(74) *Attorney, Agent, or Firm* — Oliff & Berridge, PLC

(57) ABSTRACT

A vibration damping rubber bushing including: an inner cylindrical member; a main rubber elastic body bonded to an outer circumferential face of the inner cylindrical member; a plurality of anti-slip projections provided on at least one of axial end faces of the inner cylindrical member that project axially outward from the axial end face and extend with ribbed shape in a diametrical direction on the axial end face to produce a spokewise pattern overall; and an annular water barrier projection provided on a diametrical medial section of the at least one of the axial end faces of the inner cylindrical member, projecting axially outwardly and extending circumferentially, with the anti-slip projections being disposed to both radially inner side and radially outer side of the annular water barrier projection.

6 Claims, 3 Drawing Sheets

VIBRATION DAMPING RUBBER BUSHING

INCORPORATED BY REFERENCE

The disclosure of Japanese Patent Application No. 2009-154032 filed on Jun. 29, 2009 including the specification, drawings and abstract is incorporated herein by reference in its entirety.

BACKGROUND OF THE INVENTION

1. Field of the Invention

The present invention relates generally to a vibration damping rubber bushing adapted for installation between components to be linked in a vibration damped manner, and relates in particular to a vibration damping rubber bushing having anti-slip projections formed on the axial end faces of an inner cylindrical fitting.

2. Description of the Related Art

The use of vibration damping rubber bushings in systems such as automotive suspension mechanisms is widely known. A typical vibration damping rubber bushing of this kind has a main rubber elastic body bonded to the outer circumferential face of an inner cylindrical fitting of round cylindrical shape, and is installed with the inner cylindrical fitting attached to one component of the vibration damped linkage, and with the outer circumferential face of the main rubber elastic body attached to the other component of the vibration damped linkage.

In a known design for a vibration damping rubber bushing, anti-slip projections are formed on axial end faces of the inner cylindrical fitting in order to prevent relative rotation of the inner cylindrical fitting about its center with respect to one component of the vibration damped linkage while in the installed state. JP-A-2005-337473 discloses one such design, for example. This inner cylindrical fitting is secured in the axial direction by a fastening rod passed through the interior, and is installed with its axial end faces pushing against one component of the vibration damped linkage so that the anti-slip projections bite in and function as a rotation inhibiting mechanism.

However, when anti-slip projections are formed on the axial end faces of the inner cylindrical fitting, even with the fitting pushing against one component of the vibration damped linkage, gaps tend to form between the opposed faces of the component of the vibration damped linkage and the axial end face of the inner cylindrical fitting, between adjacent anti-slip projections. A resultant risk is that rain water can seep through these gaps and penetrate to the inside circumferential face of the inner cylindrical fitting, causing problems such as rust or corrosion.

In order to address this problem, JP-A-2005-337473 proposed a construction having sealing rubber packed between adjacent anti-slip projections at the axial end faces of the inner cylindrical fitting. However, this posed the risk of a rubber coat forming over the distal edges of the anti-slip projections during the process of covering the axial end faces of the inner cylindrical fitting with the seal rubber, and the presence of such a rubber coat may impair the rotation inhibiting function afforded by wedging in by the anti-slip projections. Another risk was that the sealing rubber may experience diminished sealing performance due to deterioration or damaged caused by ozone, ultraviolet light, rainwater, particles of sand, and the like.

SUMMARY OF THE INVENTION

It is therefore one object of this invention to provide a vibration damping rubber bushing of novel construction that affords consistent sealing ability between the opposed faces of the component of the vibration damped linkage and the axial end face of the inner cylindrical fitting, without any loss of rotation inhibiting function by the anti-slip projections provided on the axial end faces of the inner cylindrical fitting.

A first mode of the present invention features a vibration damping rubber bushing adapted for installation between two components to be linked in a vibration damped manner comprising: an inner cylindrical member having opposite axial end faces, at least one of the axial end faces adapted to be pushed against one of the two components; a main rubber elastic body bonded to an outer circumferential face of the inner cylindrical member and adapted to be connected at an outer circumferential face side thereof to another of the two components; a plurality of anti-slip projections provided on the at least one of the axial end faces of the inner cylindrical member that project axially outward from the axial end face and extend with ribbed shape in a diametrical direction on the axial end face to produce a spokewise pattern overall; and an annular water barrier projection provided on a diametrical medial section of the at least one of the axial end faces of the inner cylindrical member, projecting axially outwardly and extending circumferentially, with the anti-slip projections being disposed to both radially inner side and radially outer side of the annular water barrier projection.

According to the vibration damping rubber bushing of the present mode, slot-like recesses present between adjacent anti-slip projections in the circumferential direction and extending from the radially outside edge part to the radially inside edge part of the inner cylindrical member at the axial end faces of the inner cylindrical member are obstructed by the projecting annular water barrier projection so as to disappear in the diametrical medial section of the axial end face. For this reason, even if rainwater should seep in from the outside edge of the axial end face of the inner cylindrical member through the gaps between circumferentially adjacent anti-slip projections and between the opposing faces of one component of a vibration damped linkage and the axial end face of the inner cylindrical member, the water is blocked by the annular water barrier projection, and thus does not reach the radially inside edge part of the axial end face of the inner cylindrical member, or penetrate to the inner circumferential face of the inner cylindrical member.

In particular, the annular water barrier projection that serves to block penetration of rainwater between the opposing faces of one component of a vibration damped linkage and the axial end face of the inner cylindrical member is integrally formed with the inner cylindrical member together with the anti-slip projections, thereby affording much higher endurance and strength as compared with seal rubber, so that the intended water barrier action is consistently attained at a high level.

Moreover, as no rubber coat forms over the projecting distal edges of the anti-slip projections during formation of the annular water barrier projection, the projecting distal edge portions of both the annular water barrier projection and the anti-slip projections lie exposed, and become pushed into abutment directly against a component of the vibration damped linkage. The anti-slip function afforded by biting of the anti-slip projections is consistently obtained thereby, and a high level of water barrier action is achieved through abutment or biting of the annular water barrier projection.

Additionally, because the annular water barrier projection is formed in the diametrical medial section of the axial end face of the inner cylindrical member, interference or bumping against the annular water barrier projection by other components during transport or during installation is less likely as compared with a component formed at the outermost peripheral portion of the axial end face of the inner cylindrical member for example. Thus, unanticipated damage of the annular water barrier projection can be effectively prevented, so that the intended water blocking action is achieved on a more dependable basis.

Further, the annular water barrier projection is formed in the diametrical medial section of the axial end face of the inner cylindrical member, with the anti-slip projections being formed to both the radially inner side and radially outer side of the annular water barrier projection. Each anti-slip projection accordingly has at a minimum an radially inner end part and radially outer end part vis-à-vis of the inner cylindrical member. Despite the fact that the anti-slip projections substantially disappear in the diametrical medial section of the axial end face of the inner cylindrical member due to the annular water barrier projection being formed there, the edges at the radially inner end and outer end parts of the anti-slip projections bite into the imposition face of the component of the vibration damped linkage so that their rotation inhibiting function is effectively maintained. In particular, due to the large distance separating the center axis of the inner cylindrical member from the edge part of the anti-slip projections at the end thereof lying at a radially outer edge of the inner cylindrical member, a high level of rotational moment (resistance force) acting as rotation-inhibiting force is produced, so that excellent rotation-inhibiting action is efficiently created.

A second mode of the invention provides a vibration damping rubber bushing according to the first mode wherein both the anti-slip projections and the annular water barrier projection have tapered cross section.

According to the vibration damping rubber bushing of the present mode, rotation-inhibiting action and water blocking function are produced even more effectively through biting of the projecting distal edge parts of the anti-slip projections and the annular water barrier projection when pushed against the component of the vibration damped linkage. By employing anti-slip projections and an annular water barrier projection with tapered cross sections, it makes it easier to produce the anti-slip projections and the annular water barrier projection with a cold heading process such as a header forming, or a plastic working process such as press forming.

A third mode of the invention provides a vibration damping rubber bushing according to the first or second mode wherein the projecting distal edge parts of the anti-slip projections and the annular water barrier projection are situated within the same plane extending in an axis-perpendicular direction to the inner cylindrical member.

If either the anti-slip projections or the annular water barrier projection protrude outward beyond than the other, prior to installation the protruding projections will be susceptible to damage caused by bumping against other components; and subsequent to installation there is a risk that only the protruding projections will bite in, while the non-protruding projections have substantially no function. According to the present mode, the projecting distal edge parts of both types of projections are all arranged substantially within the same plane, whereby localized damage to the projections can be avoided, and both types of projections can be disposed in stable conditions of abutment and biting so that the intended rotation inhibiting function and water blocking function are produced in a highly dependable manner.

A fourth mode of the invention provides a vibration damping rubber bushing according to any one of the first to third modes, wherein the annular water barrier projection and the anti-slip projections provided respectively to the radially inner side and the radially outer side of the annular water barrier projection connect with one another at projecting distal edge parts thereof.

In the vibration damping rubber bushing according to the present mode, the gaps between adjacent anti-slip projections in the circumferential direction are filled in and disappear due to the annular water barrier projection which projects from the axial end face of the inner cylindrical member. Thus, the anti-slip projections and the annular water barrier projection reinforce one another, improving the strength of the projections overall. For this reason, damage to individual projections may be more effectively prevented. Also, since the projections can be pushed more forcefully against the component of the vibration damped linkage, greater rotation inhibiting function and water blocking function are possible.

Whereas in this fourth mode the anti-slip projections extend out respectively both inwardly and outwardly in the diametrical direction from the inside circumferential face and the outer circumferential face of the annular water barrier projection, other modes such as the preceding first mode are not limited to such morphology of the projections. For example, in an alternative arrangement, the anti-slip projections situated to the radially inner side and/or the anti-slip projections situated to the radially outer side are formed spaced apart in the diametrical direction from the annular water barrier projection which has been formed in the diametrical medial section of the axial end face of the inner cylindrical member. By forming the annular water barrier projection independently from the anti-slip projections in this way, the force of contact of annular water barrier projection against the imposition zone on the component of the vibration damped linkage can be concentrated more effectively so as to bite therein, so that the water blocking function of the annular water barrier projection may be improved. Moreover, the anti-slip projections which have been formed separately in either the diametrical inward or outward direction from the annular water barrier projection are provided thereby with edges at their ends lying towards the annular water barrier projection as well, and the biting action of these additional edge portions affords further improved rotation inhibiting action.

A fifth mode of the invention provides a vibration damping rubber bushing according to any one of the first to fourth modes wherein the anti-slip projections and the annular water barrier projection are formed on both of the axial end faces of the inner cylindrical member.

Since the vibration damping rubber bushing constructed according the present invention has an annular water barrier projection formed in the diametrical medial section of the axial end face of the inner cylindrical member, ample rotation inhibiting action on the part of the anti-slip projections formed respectively to the radially inner side and radially outer side of the annular water barrier projection may be assured, while the annular water barrier projection affords water blocking action against rainwater infiltrating towards the radially inner side of the inner cylindrical member between circumferentially adjacent anti-slip projections.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
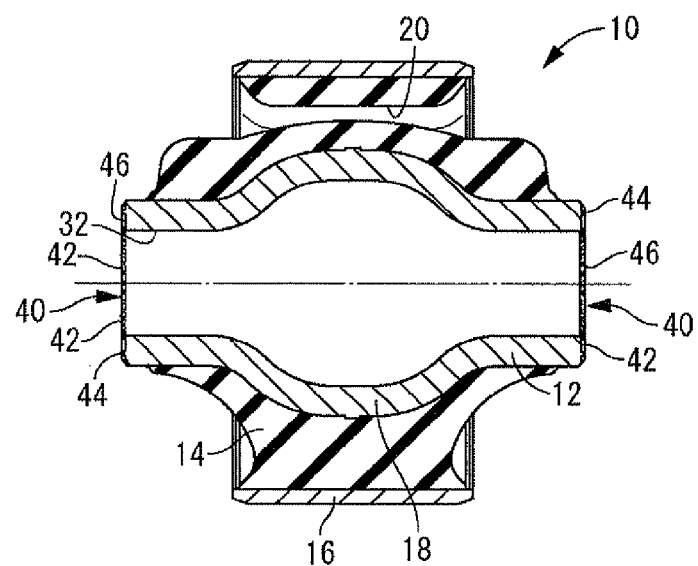
FIG. 1 is a longitudinal cross sectional view of a vibration damping rubber bushing according to one embodiment of the present invention, taken along line 1-1 of FIG. 2.
Figure 2:
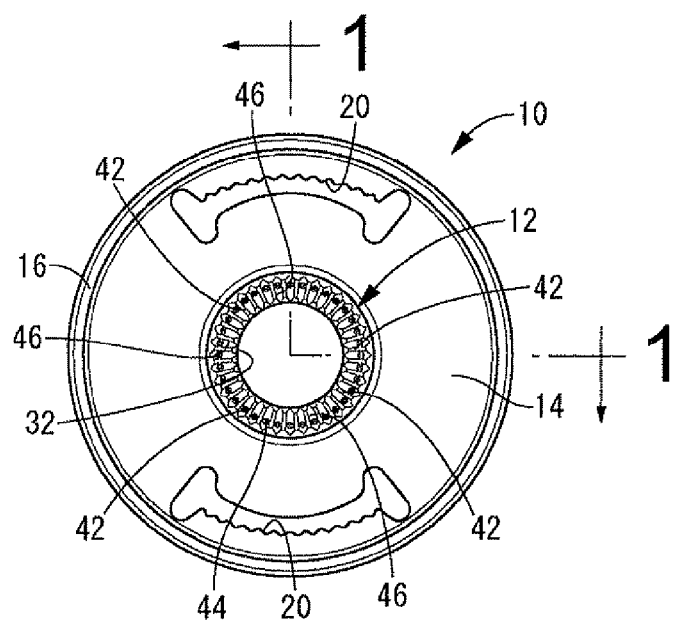
FIG. 2 is a left side view of the vibration damping rubber bushing of FIG. 1.

FIGS. 1 and 2 depict a vibration damping rubber bushing 10 according to an embodiment of the present invention. This vibration damping rubber bushing 10 is intended for installation at a mounting location on either the vehicle body side or the wheel side of a suspension arm making up part of an automotive suspension mechanism, and is designed to reduce transmission of road face vibration to the vehicle body.

To describe in greater detail, the vibration damping rubber bushing 10 has an inner cylindrical member 12 of cylindrical shape; the axial bore of the inner cylindrical member 12 is positioned on the center axis of the vibration damping rubber bushing 10. A main rubber elastic body 14 is bonded to the outer circumferential face of the inner cylindrical member 12. The main rubber elastic body 14 has thick, generally round cylindrical shape overall, and is bonded at its inside circumferential face to the outer circumferential face of the inner cylindrical member 12. An additional outer cylindrical member 16 of round cylindrical shape is bonded to the outer circumferential face of the main rubber elastic body 14. The outer cylindrical member 16 is thinner than and shorter in the axial direction than the inner cylindrical member 12, and is positioned spaced apart diametrically outward from the inner cylindrical member 12 in the axial center section of the inner cylindrical member 12, and on the same center axis as the inner cylindrical member 12. The vibration damping rubber bushing 10 may be manufactured as an integrally vulcanization molded component through molding and vulcanization of the main rubber elastic body 14 in the presence of the inner and outer cylindrical members 12, 16 for example.

In the present embodiment, the center section of the inner cylindrical member 12 defines a bulging large-diameter portion 18 produced by a process such as bulge forming, and has been tuned to reduce spring hardness in the direction of twisting. A pair of hollowed portions 20, 20 extending in the axial direction pass through the diametrical medial section of the main rubber elastic body 14. The pair of hollowed portions 20, 20 are situated in opposition along a diametrical axis, and each of them extends in the circumferential direction between the inner and outer cylindrical members 12, 16 for a distance just short of one-fourth the circumference; tuning has been carried out through adjustment of the spring ratio between the direction of opposition of the pair of hollowed portions 20, 20 and the diametrical direction orthogonal thereto.

Figure 3:
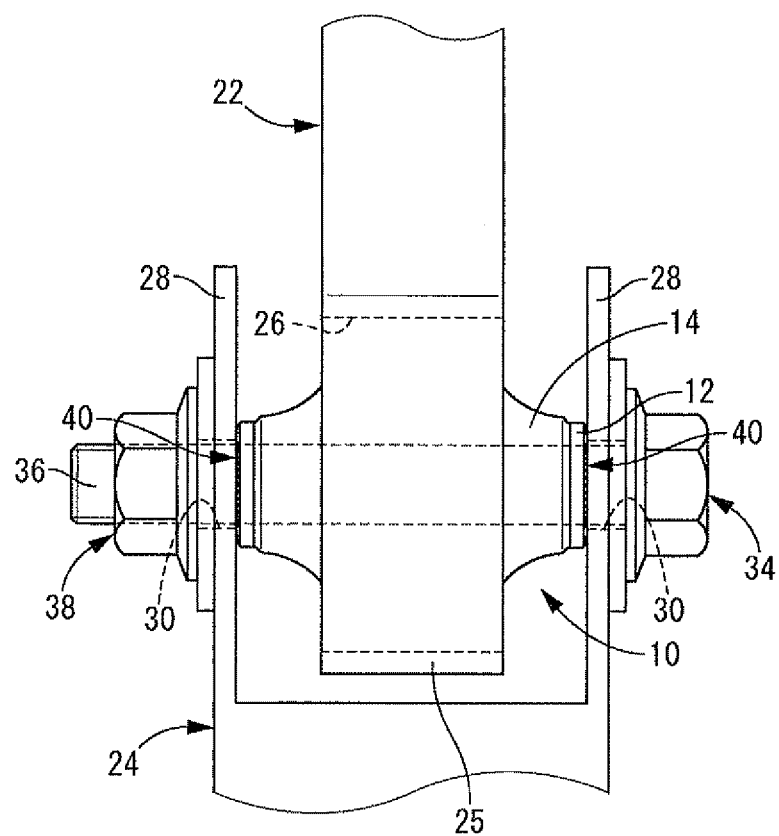
FIG. 3 is a view showing the vibration damping rubber bushing of FIG. 1 in an installed state.

As shown in FIG. 3, the vibration damping rubber bushing 10 is installed at a mounting location with respect to a vehicle body end structure 24 of a suspension arm 22. During the installation process, first, the outer cylindrical member 16 of the vibration damping rubber bushing 10 is secured with a pressure fit into an installation hole 26 of an arm eye 25 of round cylindrical shape at one end of the suspension arm 22. The vibration damping rubber bushing 10 installed in the suspension arm 22 is then fitted between the opposing faces of a pair of mounting portions 28, 28 formed on the vehicle body end structure 24. The bore 32 of the inner cylindrical member 12 is then aligned with passage holes 30, 30 formed in the pair of mounting portions 28, 28; and a mounting bolt 34 is inserted through the passage hole 30 of one of the mounting portions 28, passed through the bore 32 of the inner cylindrical member 12, and pushed out from the passage hole 30 of the other mounting portion 28. A fastening nut 38 is threaded onto a distal end screw portion 36 of the projecting mounting bolt 34 and tightened thereon so that the two axial end faces 40, 40 of the inner cylindrical member 12 are secured pushed against the opposing faces of the pair of mounting portions 28, 28.

With such a vibration damping rubber bushing 10 installed in the vehicle suspension mechanism, in order to consistently attain the intended vibration damping action, it is necessary for the pair of hollowed portions 20, 20 made in the main rubber elastic body 14 to be positioned in a specific direction, such as the lengthwise direction of the vehicle. For this reason, as depicted in FIGS. 1 and 2, a plurality of anti-slip projections 42 are formed on each of the two axial end faces 40, 40 of the inner cylindrical member 12. The tightening force of the fastening nut 38 onto the mounting bolt 34 pushes the anti-slip projections 42 against the mounting portion 28 so as to bite in, thereby inhibiting relative rotational displacement of the inner cylindrical member 12 in the circumferential direction relative to the mounting portions 28.

Figure 4:
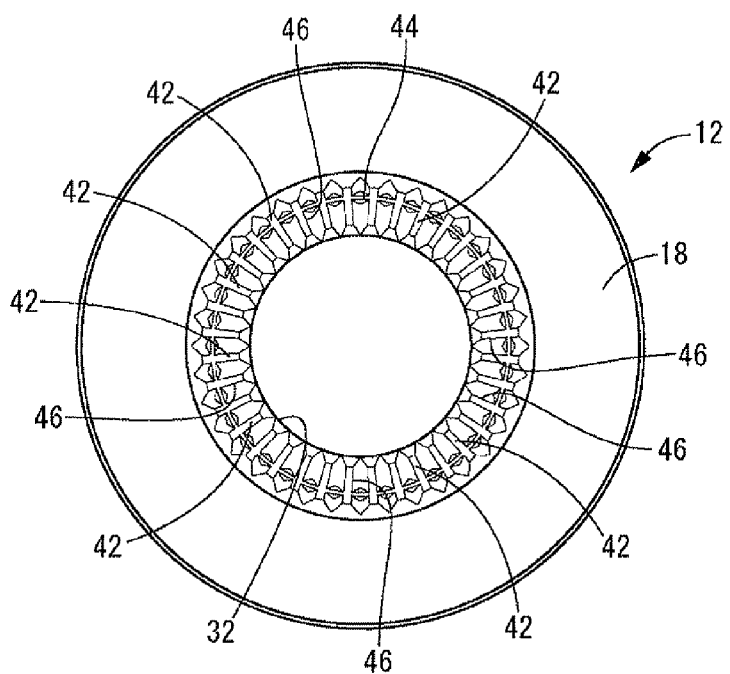
FIG. 4 is a side view of an inner cylindrical member of the vibration damping rubber bushing of FIG. 1.
Figure 5:
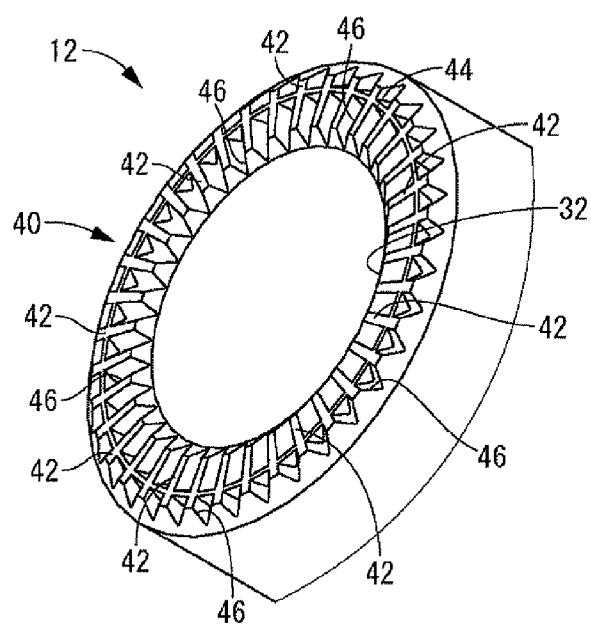
FIG. 5 is an enlarged perspective view of an axial end portion of the inner cylindrical member of FIG. 4.

As shown in FIGS. 4 and 5, the plurality of radially extending anti-slip projections 42 and an annular water barrier projection 44 that extends in the circumferential direction are formed on each of the axial end faces 40, 40 of the inner cylindrical member 12. Both the anti-slip projections 42 and the annular water barrier projection 44 have been integrally formed with the inner cylindrical member 12, and take the shape of projections that protrude axially outward from the axial end faces 40 of the inner cylindrical member 12.

The anti-slip projections 42 in particular extend linearly in the diametrical direction without any inclination towards the circumferential direction, from points in proximity to the radially inside edge to points in proximity to the radially outside edge of the axial end face 40 of the inner cylindrical member 12. Each of the two end faces of the anti-slip projections 42 in their lengthwise direction (i.e. the diametrical direction of the axial end face 40 of the inner cylindrical member 12) take the form of a sloping face extending in a skirt shape, so as to avoid chipping or deformation of the lengthwise ends of the anti-slip projections 42 associated with bumping against or colliding with other components.

The anti-slip projections 42 extend in the diametrical direction with trapezoidal cross section, and have a tapering cross sectional shape in which the width dimension in cross section becomes progressively shorter towards the projecting distal edge side. The plurality of anti-slip projections 42 are formed in proximity to one another in the circumferential direction, producing an overall arrangement in which a multitude of anti-slip projections 42 extend in a spokewise pattern centered on the center axis of the inner cylindrical member 12. That is, the multitude of anti-slip projections 42 give the circumferential cross section of the inner cylindrical member 12 a continuous saw tooth pattern.

Further, the anti-slip projections 42 are all identical in shape and size, and the projecting distal edge faces of all of the anti-slip projections 42 are positioned on the same plane orthogonal to the center axis of the inner cylindrical member 12. Thus, with the vibration damping rubber bushing 10 installed as depicted in FIG. 3, the projecting distal edge parts of all of the anti-slip projections 42 are pushed against the opposed flat face of the mounting portion 28 juxtaposed against the axial end face 40 of the inner cylindrical member 12.

Meanwhile, the annular water barrier projection 44 on the axial end face 40 of the inner cylindrical member 12 has an annular shape that extends continuously in the circumferential direction through the diametrical medial section. Like the anti-slip projections 42, the annular water barrier projection 44 extends in the circumferential direction with trapezoidal cross section, and has a tapering cross sectional shape of progressively shorter width dimension in cross section towards the projecting distal edge side.

The annular water barrier projection 44 has unchanging cross sectional shape about its entire circumferential length, and the entire length of the projecting distal edge face of the annular water barrier projection 44 is positioned on a single plane orthogonal to the center axis of the inner cylindrical member 12. Additionally, the projecting distal edge face of this annular water barrier projection 44 is positioned on the same plane as the plane on which are positioned the projecting distal edge faces of the anti-slip projections 42 described above. That is, all of the projecting distal edge faces of both the annular water barrier projection 44 and the plurality of anti-slip projections 42 are positioned on the same plane. Thus, with the vibration damping rubber bushing 10 installed as depicted in FIG. 3, these projecting distal edge faces, not just of all of the anti-slip projections 42 but also of the annular water barrier projection 44, push against the flat opposed face of the mounting portion 28 juxtaposed against the axial end face 40 of the inner cylindrical member 12.

Further, because the annular water barrier projection 44 is formed in the diametrical medial section of the axial end face 40 of the inner cylindrical member 12 (in the present embodiment, at a location somewhat eccentric towards the outside in the diametrical direction, as depicted in FIG. 4), all of the anti-slip projections 42 intersect the annular water barrier projection 44.

The projecting distal edge face of the annular water barrier projection 44 extends continuously in the circumferential direction through these intersection points as well, thereby defining a closed ring-shaped face in the circumferential direction designed to push against the mounting portion 28 which has been juxtaposed against the axial end face 40 of the inner cylindrical member 12. The anti-slip projections 42 also extend respectively towards the radially inner side and the radially outer side of the annular water barrier projection 44 from their intersection points with the annular water barrier projection 44, and are designed so that their radially inner side and radially outer side segments each push against the mounting portion 28 which has been juxtaposed against the axial end face 40 of the inner cylindrical member 12.

Slot-like recesses 46 that extend in the diametrical direction are respectively present between circumferentially adjacent anti-slip projections 42, 42 on the axial end faces 40 of the inner cylindrical member 12; however, the annular water barrier projection 44 cuts across these slot-like recesses 46 in the circumferential direction in their lengthwise medial sections (the diametrical medial section of the axial end face 40). Because the annular water barrier projection 44 is continuous about the entire circumference, all of the slot-like recesses 46 are blocked off by the annular water barrier projection 44 and disappear in their lengthwise medial section.

Consequently, with the vibration damping rubber bushing 10 constructed as above installed as depicted in FIG. 3, even if rainwater has seeped between the mounting portion 28 of the vehicle body end structure 24 and the axial end face 40 of the inner cylindrical member 12 and into the gaps (slot-like recesses 46) between circumferentially adjacent anti-slip projections 42, 42 through their outside peripheral openings, the water is blocked by the annular water barrier projection 44. Thus, rainwater cannot reach the radially inner edge part of the axial end face 40 of the inner cylindrical member 12, and cannot enter the bore 32 of the inner cylindrical member 12.

Moreover, because the annular water barrier projection 44 is formed in the diametrical medial section of the axial end face 40 of the inner cylindrical member 12, damage to the annular water barrier projection 44 caused by interference or bumping against other components during transport or during installation is effectively prevented, so the intended water blocking action described above can be more consistently achieved.

Further, because the anti-slip projections 42 extend in the diametrical direction to both the radially inner side and radially outer side of the annular water barrier projection 44, when these anti-slip projections 42 are pushed against and bite into the mounting portion 28 of the vehicle body end structure 24, their function of inhibiting rotation of the inner cylindrical member 12 about the center axis of the vehicle body end structure 24 may be effectively produced unhampered by the annular water barrier projection 44.

In particular, when the anti-slip projections 42 are pushed against the mounting portion 28 of the vehicle body end structure 24, they more effectively bite into the mounting portion 28 due to the effect of concentrated pushing force by the edge portions at their ends. Thus, the edge portion at the radially inside end and the edge portion at the radially outside end of the anti-slip projections 42 which project out to both the radially inner side and radially outer side from the annular water barrier projection 44 actively bite into the mounting portion 28, so that their function of inhibiting rotation of the inner cylindrical member 12 about the center axis of the vehicle body end structure 24 is effectively produced. In particular, a high level of rotational moment (resistance force) acting as rotation-inhibiting force is produced as a result of the large distance separating the center axis of the inner cylindrical member 12 from the edge part of the anti-slip projections 42 at the end thereof situated close to the radially outer side of the inner cylindrical member 12.

While the present invention has been shown herein in terms of the preferred embodiment, the invention is in no way limited to the specific disclosure of the embodiment.

For example, the combination of the annular water barrier projection 44 and the anti-slip projections 42 may be provided on one axial end face only. Specifically, the vibration damping rubber bushing 10 has various different possible modes of installation, such as with its axial direction aligned with the vertical direction, or installed with a seal rubber disposed to one side in the axial direction; and when water blocking functionality is required for the axial end face on only one side of the inner cylindrical member 12, the annular water barrier projection 44 may be provided only on one axial side of the inner cylindrical member 12. In instances in which the inner cylindrical member 12 will be installed with only one of the axial end faces pushed against a mounting member, or in instances rotation inhibiting function at a single axial end face will suffice, the anti-slip projections 42 may likewise be formed on the one axial end face only.

The anti-slip projections 42 may be formed separately to the radially outer side and the radially inner side of the annular water barrier projection 44. In this case, both the anti-slip projections 42 to the radially inner side and those to the radially outer side of the annular water barrier projection 44 will have an radially inside edge and an radially outside edge, and the biting action afforded by these additional edges can improve the rotation inhibiting function.

The anti-slip projections 42 to either diametrical side of the annular water barrier projection 44 need not necessarily be formed along mutually identical diametrical lines. For example, it is possible for the anti-slip projections 42 to the radially inner side of the annular water barrier projection 44 and the anti-slip projections 42 to the radially outer side to be formed at locations staggered in the circumferential direction with respect one another, or to be formed at mutually different circumferential pitch (i.e. spacing, size, etc.).

Nor is it essential for the anti-slip projections 42 to either diametrical side of the annular water barrier projection 44 to all extend linearly in the diametrical direction. For example, the projections may be oriented at angles with respect to diametrical lines, or in a spiral pattern produced by extending them along angled and curving paths. A spiral pattern curved towards one side in the circumferential direction is effective in improving rotation inhibiting force in a particular direction.

The annular water barrier projection 44 is not limited to one member, and several may be formed spaced apart in the diametrical direction according factors such as the required water blocking ability and the properties of the member against which the projections are pushed. Where several may be provided spaced apart in the diametrical direction, diametrical projections may or may not be formed diametrically between them.

The projecting distal edge faces of the anti-slip projections 42 and the annular water barrier projection 44 need not be positioned in the same plane extending in the axis-perpendicular direction of the inner cylindrical member 12. For example, the projecting distal edge face of the annular water barrier projection 44 may project further outward beyond the anti-slip projections 42 in the axial direction of the inner cylindrical member 12 so that the extent of bite into the other member by the annular water barrier projection 44 is greater than that of the anti-slip projections 42, to provide more consistently high water blocking action. Conversely, the projecting distal edge faces of the anti-slip projections 42 may project further outward beyond the annular water barrier projection 44 in the axial direction of the inner cylindrical member 12 so that the extent of bite into the other member by the anti-slip projections 42 is greater than that of the annular water barrier projection 44, to provide greater rotation inhibiting force. Some number of anti-slip projections 42 may have different projecting heights and shapes in consideration of factors such as the required rotation inhibiting force and the properties of the member against which the projections are pushed; and it is also possible for a single anti-slip projection 42 to have varying projecting height and/or shape along its lengthwise direction.

What is claimed is:

1. A vibration damping rubber bushing adapted for installation between two components to be linked in a vibration damped manner comprising:

an inner cylindrical member having opposite axial end faces, at least one of the axial end faces adapted to be pushed against one of the two components;

a main rubber elastic body bonded to an outer circumferential face of the inner cylindrical member and adapted to be connected at an outer circumferential face side thereof to another of the two components;

a plurality of anti-slip projections provided on the at least one of the axial end faces of the inner cylindrical member that project axially outward from the axial end face and extend with ribbed shape in a diametrical direction on the axial end face to produce a spokewise pattern overall; and an annular water barrier projection provided on a diametrical medial section of the at least one of the axial end faces of the inner cylindrical member, projecting axially outwardly and extending circumferentially, with the anti-slip projections being disposed to both radially inner side and radially outer side of the annular water barrier projection, wherein the anti-slip projections extend linearly in the diametrical direction from points in proximity to a radially inside edge to points in proximity to a radially outside edge of the at least one of the axial end faces of the inner cylindrical member, and wherein recesses that extend in the diametrical direction are respectively present between the anti-slip projections that are circumferentially adjacent, and the annular water barrier projection extends across these recesses in the circumferential direction at medial sections thereof in the diametrical direction.

2. The vibration damping rubber bushing according to claim 1, wherein both the anti-slip projections and the annular water barrier projection have tapered cross section.

3. The vibration damping rubber bushing according to claim 1, wherein projecting distal edge parts of the anti-slip projections and the annular water barrier projection are situated within the same plane extending in an axis-perpendicular direction to the inner cylindrical member.

4. The vibration damping rubber bushing according to claim 1, wherein the annular water barrier projection and the anti-slip projections provided respectively to the radially inner side and the radially outer side of the annular water barrier projection connect with one another at projecting distal edge parts thereof.

5. The vibration damping rubber bushing according to claim 1, wherein the anti-slip projections and the annular water barrier projection are formed on both of the axial end faces of the inner cylindrical member.

6. The vibration damping rubber bushing according to claim 1, wherein each of the two end faces of the anti-slip projections in the diametrical direction has a sloping face extending in a skirt shape.

* * * * *